(12) United States Patent
Ahmad

(10) Patent No.: US 7,656,553 B2
(45) Date of Patent: Feb. 2, 2010

(54) PRINTING USER-CREATED CUSTOM HEADER/FOOTER/SEPARATOR PAGES FROM THE PRINTER DRIVER

(75) Inventor: Athar L. Ahmad, Redmond, WA (US)

(73) Assignee: Ricoh Company, Ltd., Tokyo (JP)

( * ) Notice: Subject to any disclaimer, the term of this patent is extended or adjusted under 35 U.S.C. 154(b) by 818 days.

(21) Appl. No.: 11/343,950

(22) Filed: Jan. 30, 2006

(65) Prior Publication Data

US 2007/0177207 A1    Aug. 2, 2007

(51) Int. Cl.
*G06K 15/00*     (2006.01)
*B41J 29/38*     (2006.01)

(52) U.S. Cl. .......................................... 358/1.18; 347/5
(58) Field of Classification Search ............... 347/5, 347/19; 709/249, 250; 358/1.9, 1.18, 1.15
See application file for complete search history.

(56) References Cited

U.S. PATENT DOCUMENTS

| | | | | |
|---|---|---|---|---|
| 7,142,321 B2* | 11/2006 | Tomita et al. | ............... | 358/1.15 |
| 7,386,791 B2* | 6/2008 | Jacobson | .................... | 715/274 |
| 7,505,179 B2* | 3/2009 | Matsunoshita et al. | ..... | 358/3.28 |
| 2005/0008387 A1* | 1/2005 | Sato | ............................ | 399/81 |
| 2005/0214017 A1* | 9/2005 | Isobe et al. | ................... | 399/82 |
| 2005/0275865 A1* | 12/2005 | Lee | ............................ | 358/1.13 |
| 2006/0044342 A1* | 3/2006 | Tajika et al. | .................. | 347/19 |
| 2006/0074816 A1* | 4/2006 | Hibara et al. | ............... | 705/400 |
| 2006/0092223 A1* | 5/2006 | Ross et al. | ..................... | 347/43 |

* cited by examiner

*Primary Examiner*—Jerome Grant, II
(74) *Attorney, Agent, or Firm*—Hickman Palermo Truong & Becker LLP; Christian A. Nicholes

(57) ABSTRACT

A method for customizing header pages, footer pages, and/or separator pages is disclosed. According to one aspect, a user interface is displayed. The user interface comprises user interface elements through which a user can specify user-customized content that is to appear on an additional page that is to be printed with the pages of an electronic document. A user-generated representation of the content is received through the user interface. A printer driver generates modified print data based on additional print data, which represents the additional page, and original print data, which represents the electronic document. The modified print data causes the printing device to print the user-customized content on a header, footer, or separator page. As a result, when the printing device receives the modified print data, the printing device prints the header, footer, or separator page, with the user-customized content, in addition to the pages of the electronic document.

18 Claims, 8 Drawing Sheets

PRINTING USER-CREATED CUSTOM HEADER/FOOTER/SEPARATOR PAGES FROM THE PRINTER DRIVER

FIELD OF THE INVENTION

The invention relates to printing devices, and more specifically, to a technique for printing user-created custom header, footer, and/or separator pages using a printer driver.

BACKGROUND OF THE INVENTION

Printing devices, such as printers, copy machines, and multi-function peripherals (MFPs) such as the Ricoh Aficio Color 6513 system, are often designed to print header, footer, and/or separator pages in conjunction with the pages of an electronic document. As described herein, a "header" page is a page that is printed before the first page of an electronic document, a "footer" page is a page that is printed after the last page of an electronic document, and a "separator" page is a page that is printed in between at least two pages of an electronic document.

Header pages, footer pages, and separator pages may be considered to be separate from an electronic document itself. For example, when a user instructs a word processing application to print an electronic document, the original print data that represents the electronic document does not contain data for the header page, footer page, or separator pages that are described herein. Such header, footer, and separator pages are automatically added to the print data stream after the user instructs the word processing application to print the document. For example, header, footer, and separator pages might be added to the print data stream by a printing device upon receiving a print data stream that consists only of data that represents the electronic document.

Since it is common for multiple users to send electronic documents to the same printing device, header pages and footer pages are useful for separating one user's printed documents from other users' printed documents. This separation helps prevent unfortunate incidences where one user accidentally takes, along with his printed documents, another user's printed documents from an output tray of the printing device. The header pages and/or footer pages help to visually separate the printed documents in the output tray so that users can tell where one user's printed documents end and another user's printed documents begin. Alternatively, header pages and footer pages can help to separate multiple copies of the same printed document where the printing of the multiple copies was initiated by a single user.

Separator pages, on the other hand, are useful for separating sheets of print media within a printed document. Some types of print media, such as transparency sheets, tend to stick together when they come in contact with each other. Once transparency sheets become stuck together, it can be difficult and time-consuming to separate them. Additionally, because of their transparent nature, it can be difficult, when viewing a stack of transparency sheets, for a person to determine the printed contents of each transparency sheet individually. Looking down at a stack of unseparated transparency sheets, one often sees the contents of all of the sheets, and cannot tell which sheet contains which content. By automatically interleaving transparency sheets and other kinds of media with opaque, non-sticking separator pages, a printing device can obviate the problems described above.

Separator pages are typically blank. Sometimes header or footer pages are blank. Other times, some rudimentary, non-customizable information is printed on the header or footer pages. The scant information that is printed on a header or footer page is often hard-coded and cannot be changed or customized by a user of the printing device.

The inability of a user of a printing device to change, either substantially or easily, the printed contents of header, footer, or separator page is unfortunate. If the printed contents of header and footer pages could be customized easily by users of a printing device, then the users might find it easier to distinguish between multiple printed documents sitting in the printing device's output tray. The users might not need to scrutinize the header and footer pages as carefully to determine whose printed document was whose.

Based on the foregoing, there is a need for a printing device that allows users to customize header, footer, and separator pages, and that allows them to do so through easily-used and convenient means.

SUMMARY OF THE INVENTION

A method for customizing header pages, footer pages, and/or separator pages is disclosed. According to one aspect, a user interface is displayed. The user interface comprises user interface elements through which a user can specify user-customized content that is to appear on a header page, footer page, or separator page that a printer driver for a printing device automatically adds to pages of an electronic document. A user-generated representation of the content is received through the user interface. Modified print data is generated based on (a) application program-generated original print data that represents the pages of the electronic document and (b) additional print data that contains the user-customized content. The additional print data causes the printing device to print the user-customized content on a header page, footer page, or separator page. As a result, when the printing device receives the modified print data, the printing device prints the header page, footer page, or separator page, with the user-customized content, in addition to the pages of the electronic document.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

Figure 1:
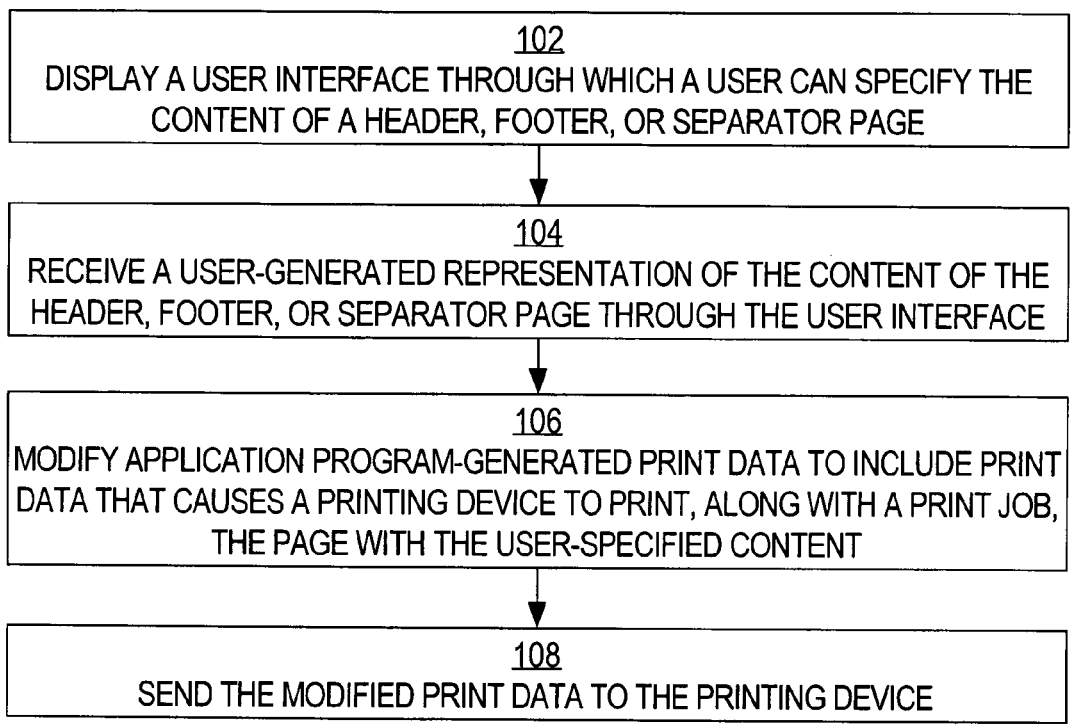
FIG. 1 is a flow diagram that depicts an overview of a technique for printing user-customized header/footer/separator pages, according to an embodiment of the invention.

FIG. 1 is a flow diagram that depicts an overview of a technique for printing user-customized header/footer/separator pages, according to an embodiment of the invention. For example, a printer driver that acts as an intermediary between application programs and a printing device may perform the technique depicted.

In block 102, a user interface is displayed. The user interface comprises user interface elements through which a user can specify content that is to appear on a header page, footer page, or separator page—generally, an "additional" page that a printer driver for a printing device automatically adds to print data that represents pages of an application program-generated electronic document. For example, a printer driver may display, to a user, a visual interface that comprises controls for adding text and/or images to a visual representation or "preview" of such an "additional" page. Such an "additional" page typically is not dependent on any particular print job or application program; once such an "additional" page has been defined, the printer driver typically will add additional print data representing the "additional" page to all original print data that the user desires, regardless of which application program generated that original print data.

In block 104, a user-generated representation of the content is received through the user interface. For example, the printer driver may receive a description of a customized "additional" page that a user created by adding text and/or images to a visual representation of the "additional" page via the user interface. The visual representation may depict with great accuracy what the "additional" page will look like when it is printed. The representation may be stored on a persistent storage device when the user indicates that the representation is complete.

In block 106, print data that causes the printing device to print the "additional" page is automatically added to print data that represents an application program-generated electronic document. For example, after the content of the "additional" page has been defined, whenever any application program sends print data to the printer driver, the printer driver may modify the print data so that the print data includes additional instructions that cause the printing device to print the "additional" page, with the user-customized content, in addition to the pages of the application program-generated electronic document. Depending on whether the "additional" page is a header page, a footer page, or a separator page, the instructions that the printer driver adds to the print data may cause the printer driver to print the "additional" page before, after, or in between the pages of the electronic document defined by the application program.

In block 108, the printer driver sends the modified print data toward the printing device. When the printing device receives the modified print data, the printing device prints the pages represented therein, including the "additional" page that the application program did not send to the printer driver.

Example System

Figure 2:
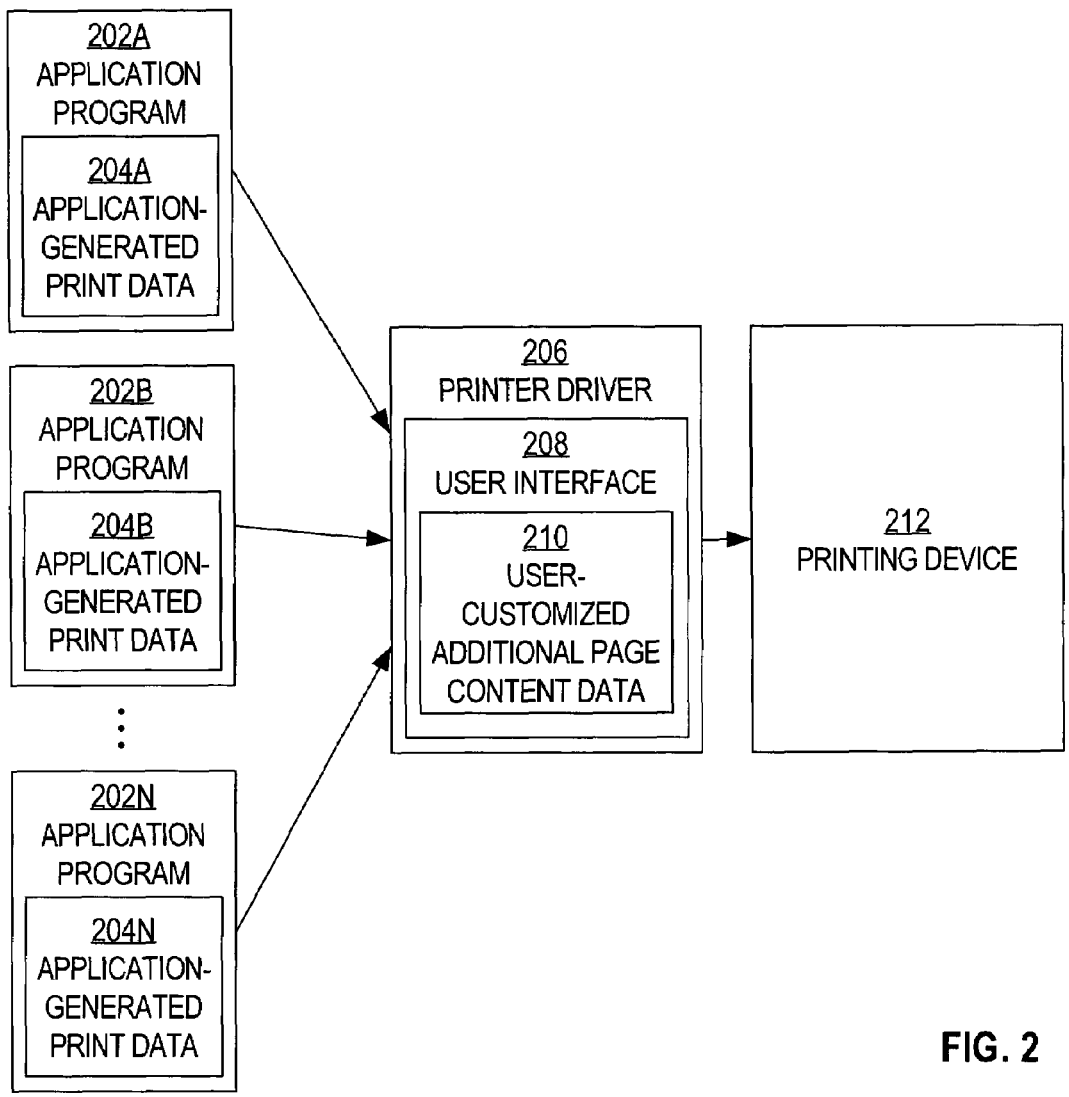
FIG. 2 is a block diagram that depicts an example system in which a printer driver is configured to add a user-customized header/footer/separator page to print data that represents an application program-generated electronic document, according to an embodiment of the invention.

FIG. 2 is a block diagram that depicts an example system in which a printer driver is configured to add a user-customized header/footer/separator page to print data that represents an application program-generated electronic document, according to an embodiment of the invention. The technique described above with reference to FIG. 1, and other techniques described herein, may be performed within the system depicted in FIG. 2.

The system depicted in FIG. 2 comprises several application programs 202A-N. Applications programs 202A-N may execute on the same or different computer systems. Application programs 202A-N may differ from each other. Each of application programs 202A-N generates corresponding application-generated print data 204A-N. The print data generated by each application program may differ from the print data generated by the other application programs. For example, application 202A might be a word processor that generates print data that represents pages of a document, and application 202B might be a digital image editor that generates print data that represents an image.

Typically, each of application programs 202A-N has some print mechanism, such as a "print" menu item or a visual control such as an icon that looks like a printer, that, when activated by a user, causes that application program to invoke printer driver 206. Thus, each of application programs 202A-N may invoke the same printer driver 206. Because the functionality of printer driver 206 can be invoked by any of application programs 202A-N in one embodiment of the invention, none of application programs 202A-N needs to separately implement the custom header/footer/separator page generating functionality that printer driver 206 implements.

Printer driver 206 may reside on the same or on different computer systems as the computer systems on which applications 202A-N reside. Printer driver 206 may be a modified version of a Microsoft Windows printer driver, for example. Printer driver 206 may be especially designed to serve as an interface between a particular operating system and the particular kind of printing device that is printing device 212. Different printer drivers may exist for different printing devices. Each such printer driver may implement the functionality described below.

When printer driver 206 is invoked, programmatic code contained within printer driver 206 displays user interface 208 to a user of the application program that invoked the print mechanism. User interface 208 may comprise multiple user-selectable controls that pertain to printing data. Some specific examples of user interface 208 are described further below. According to one embodiment of the invention, among the controls displayed within user interface 208 are one or more controls that allow a user to specify the content of a header/footer/separator page. The data that represents that content is shown in FIG. 2 as user-customized additional page content data 210. Specific examples of techniques through which a user can specify the content of such a page are described further below.

After a user has specified additional page content data 210 through user interface 208 of printer driver 206, the user may activate another control of user interface 208 to cause printer driver 206 to modify one or more of application-generated print data 204A-N, which one or more of application programs 202A-N sent toward printer driver 206. This modification causes the print data to include additional instructions that were not within the application-generated print data received by printer driver 206. Such additional instructions, when received by printing device 212, cause printing device 212 to print a header page, footer page, or separator page(s) (depending on user selections) along with pages specified within the print data received from one or more of application programs 202A-N. The header page, footer page, or separator page(s) will have printed thereon, by printing device 212, the user-customized additional page content data 210.

Printer driver 206 sends the modified print data toward printing device 212. Printing device 212 may be a printer, a copy machine, or a multi-function peripheral (MFP) such as the Ricoh Aficio Color 6513 system, for example. Printing device 212 typically is separate from the computer system on which printer driver 206 resides; printer driver 206 may send the modified print data over a network connection or other cable toward printing device 212. Upon receiving the modified print data, printing device 212 prints pages of the electronic document, including the header page, footer page, or separator page(s) which represent the customized page specified within user-customized additional page content data 210.

Printing Header/Footer/Separator Pages

Figure 3:
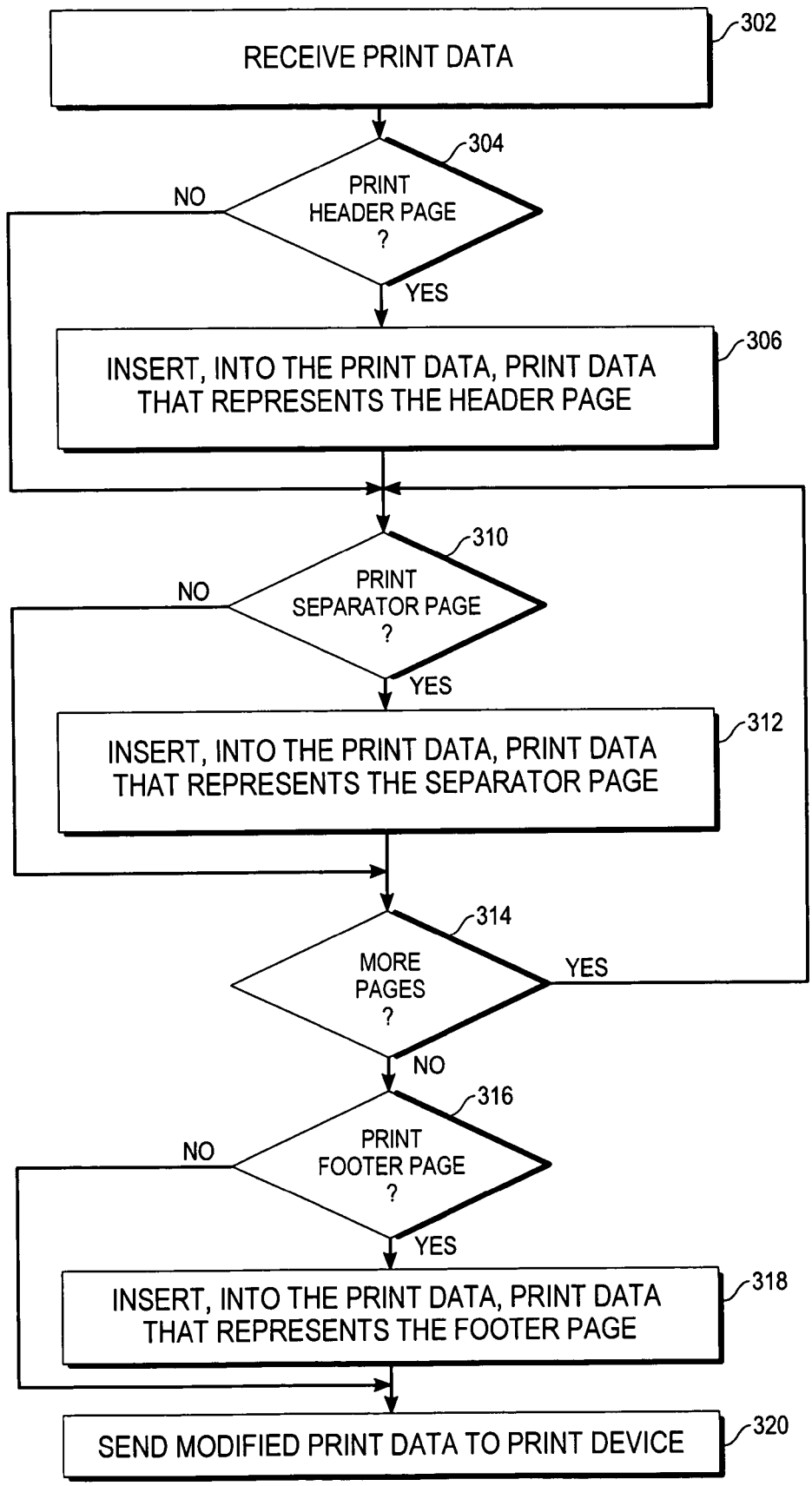
FIG. 3 is a flow diagram that illustrates an example of the operations that a printer driver might perform in order to add header/footer/separator page(s) to print data received from an application program, according to an embodiment of the invention.

FIG. 3 is a flow diagram that illustrates an example of the operations that a printer driver might perform in order to add header/footer/separator page(s) to print data received from an application program, according to an embodiment of the invention. For example, printer driver 206, shown in FIG. 2, might perform such operations. Each of the header/footer/separator page(s) discussed below has printed thereon the customized content specified by the user.

In block 302, print data is received. In one embodiment of the invention, the print data represents an electronic document. In block 304, it is determined whether a header page should be printed. In one embodiment of the invention, the choice of whether a header page should be printed is specified by a user who manipulates controls of user interface 208, shown in FIG. 2, to indicate this choice. If it is determined that a header page should be printed, then control passes to block 306. Otherwise, control passes to block 308.

In block 306, print data that represents a header page is inserted into the print data that was received in block 302, before the other pages represented in the print data. Control passes to block 310.

In block 310, it is determined whether a separator page should be printed. In one embodiment of the invention, the choice of whether a separator page should be printed is specified by a user who manipulates controls of user interface 208, shown in FIG. 2. For example, in one embodiment of the invention, a user can specify a frequency, in pages, with which separator pages should be interspersed within a printed document. For example, a user might specify, through user interface 208, that a separator page should be printed after the printing of every "N" pages of a document, where "N" is some number. If it is determined that a separator page should be printed (e.g., based on the user-specified frequency and the number of pages that have been printed since the previous separator page was printed), then control passes to block 312. Otherwise, control passes to block 314.

In block 312, print data that represents a separator page is inserted into the print data at the appropriate location between the represented pages of the electronic document. Control passes to block 314.

In block 314, it is determined whether there are any more pages in the electronic document/print data. For example, print driver 206, shown in FIG. 2, may determine whether all of the pages represented in the print data have been processed. If at least one page represented in the print data has not yet been processed, then control passes back to block 308, in which the next page is processed. Alternatively, if there are no more pages to print, then control passes to block 316.

In block 316, it is determined whether a footer page should be printed. In one embodiment of the invention, the choice of whether a footer page should be printed is specified by a user who manipulates controls of user interface 208, shown in FIG. 2, to indicate this choice. If it is determined that a footer page should be printed, then control to block 318. Otherwise, control passes to block 320.

In block 318, print data that represents a footer page is inserted into the print data. Control passes to block 320.

In block 320, the modified print data, including a representation of any header, footer, and/or separator page(s) not originally indicated in the electronic document, is sent to the printing device for printing.

Example User Interfaces

As is described above with reference to block 102 of FIG. 1, in one embodiment of the invention, a user interface is displayed to a user. The user interface comprises user interface elements through which a user can specify content that is to appear on a header page, footer page, or separator page—generally, an "additional" page that a printer driver for a printing device automatically adds to pages of an application program-generated electronic document. For example, as is described above with reference to FIG. 2, when printer driver 206 is invoked, programmatic code contained within printer driver 206 displays user interface 208 to a user of an application program that invoked a print mechanism.

Figure 4:
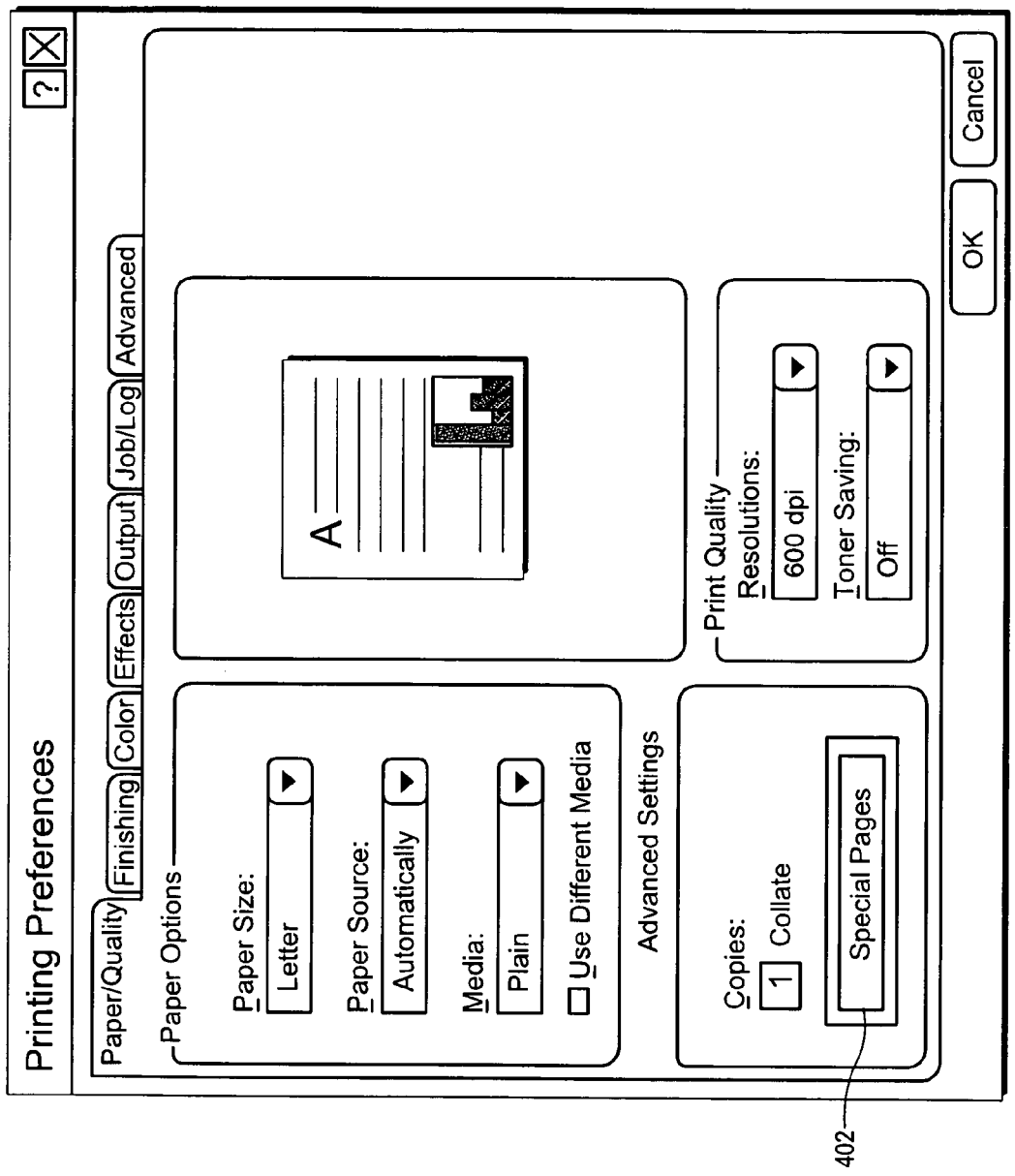
FIG. 4 is a block diagram that depicts an example main printing user interface through which a user can access a custom page-defining user interface, according to an embodiment of the invention.

FIG. 4 is a block diagram that depicts an example main printing user interface through which a user can access a custom page-defining user interface, according to an embodiment of the invention. In one embodiment of the invention, the user interface depicted in FIG. 4 is the user interface that printer driver 206 initially displays to a user when printer driver 206 is invoked. Through this initial user interface, labeled "Printing Preferences," a user can access a subsequent user interface, labeled "Special Pages." The "Special Pages" user interface is described further below with reference to FIG. 5.

With reference to FIG. 4, the "Printing Preferences" user interface comprises multiple tabs through which a user can access dialog boxes for "Paper/Quality," "Finishing," "Color," "Effects," "Output," "Job/Log," and "Advanced" printing feature options. The "Paper/Quality" dialog box is illustrated in FIG. 4.

Figure 5:
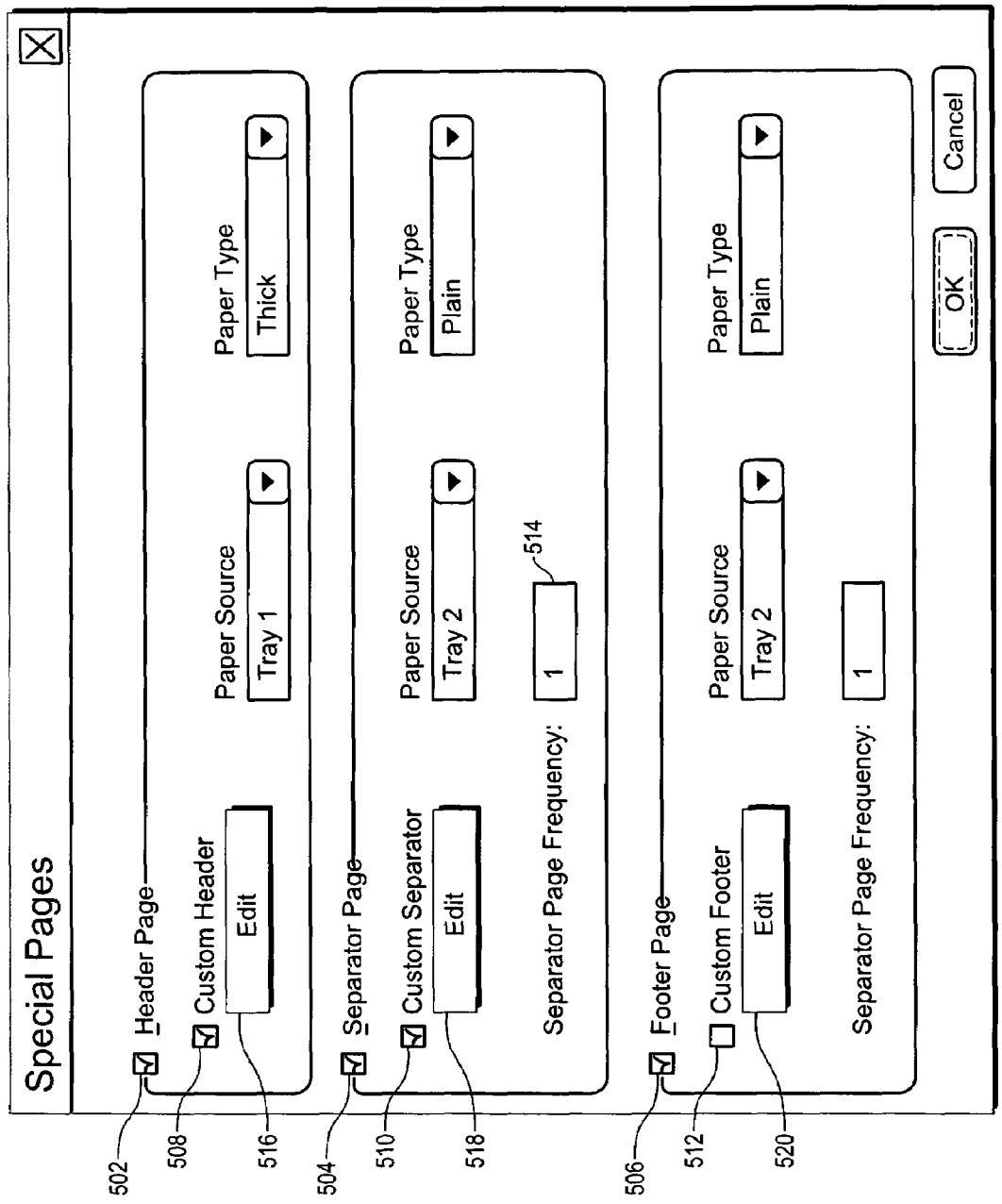
FIG. 5 is a block diagram that depicts an example "Special Pages" user interface, according to an embodiment of the invention.

Within the "Paper/Quality" dialog box there are multiple user-specifiable options. For example, there is a "Paper Size" drop-down menu, a "Paper Source" drop-down menu, a "Media" drop-down menu, and a "Copies" text field through which a user can specify how many copies of a document are to be printed. Additionally, according to an embodiment of the invention, the "Paper/Quality" dialog box includes a "Special Pages" button 402. According to one embodiment of the invention, in response to a user's activation of the "Special Pages" button 402, the "Special Pages" dialog box, shown in FIG. 5, is displayed to a user. For example, printer driver 206 may display the "Special Pages" dialog box to a user in response to that user activating "Special Pages" button 402.

FIG. 5 is a block diagram that depicts an example "Special Pages" dialog box, according to an embodiment of the invention. The "Special Pages" dialog box includes a header page checkbox 502, a separator page checkbox 504, and a footer page checkbox 506. A user may check or uncheck these checkboxes as the user desires. If a particular one of checkboxes 502-506 is checked, then printer driver 206 will cause the corresponding "additional" page(s) (e.g., header, separator, and/or footer) to be added to the print data that is sent to printing device 212.

Whether the "additional" pages are default pages or user-customized pages is controlled by custom header checkbox 508, custom separator checkbox 510, and custom footer checkbox 512. If a particular one of checkboxes 508-512 is checked, then printer driver 206 will use corresponding stored user-customized additional page content data to generate the print data for the corresponding "additional" page(s) (e.g., header, separator, and/or footer). In one embodiment of the invention, a different set of user-customized additional page content data may be generated and stored for each of the header page, the separator page(s), and the footer page. Thus, the contents of each of these pages may differ based on user input and desire.

In one embodiment of the invention, for each of the header page, separator page(s), and footer page, the "Special Pages" dialog box includes controls (e.g., drop-down menus) that allow a user to specify the paper source (e.g., paper tray) from which printing device 212 will draw sheets of media on which to print the corresponding "additional" pages. Additionally, in one embodiment of the invention, the "Special Pages" dialog box includes controls (e.g., drop-down menus) that allow a user to specify the paper type (e.g., thick, plain, transparency, etc.) that printing device 212 should use to print the corresponding "additional" pages. Thus, header pages, separator pages, and footer pages may be printed on different types of media, drawn from different paper trays, according to user input and desire.

In one embodiment of the invention, the "Special Pages" dialog box also includes a separator page frequency box 514. A user can enter a number in this box. The number entered determines how many pages of an application-originated electronic document will be printed before printer driver 206 inserts separator page print data into the print data stream. For example, if the number "1" is entered into box 514, then printer driver 206 will cause a separator page to be printed between every page of an electronic document, assuming that separator page checkbox 504 is checked. For another example, if the number "2" is entered into box 514, then printer driver 206 will cause a separator page to be printed after each 2 pages of an electronic document, assuming that separator page checkbox 504 is checked.

As is discussed above, if a particular one of checkboxes 508-512 is checked, then printer driver 206 will use corresponding stored user-customized additional page content data to generate the print data for the corresponding "additional" page(s) (e.g., header, separator, and/or footer). In one embodiment of the invention, "Special Pages" dialog box includes a custom header page edit button 516, a custom separator page edit button 518, and a custom footer page edit button 520. When a user activates a particular one of buttons 516-520, code within printer driver 206 causes a corresponding "Custom Page" dialog box to be displayed to the user. There may be different "Custom Page" dialog boxes for each of the header page, the separator page(s), and the footer page.

Through the controls included in the "Custom Page" dialog box for a particular "additional" page, the user can specify the user-customized additional page content data for that kind (e.g., header, separator, or footer) of "additional" page. An example "Custom Page" dialog box is described below with reference to FIG. 6.

Defining User-Customized Additional Page Content Data

Figure 6:
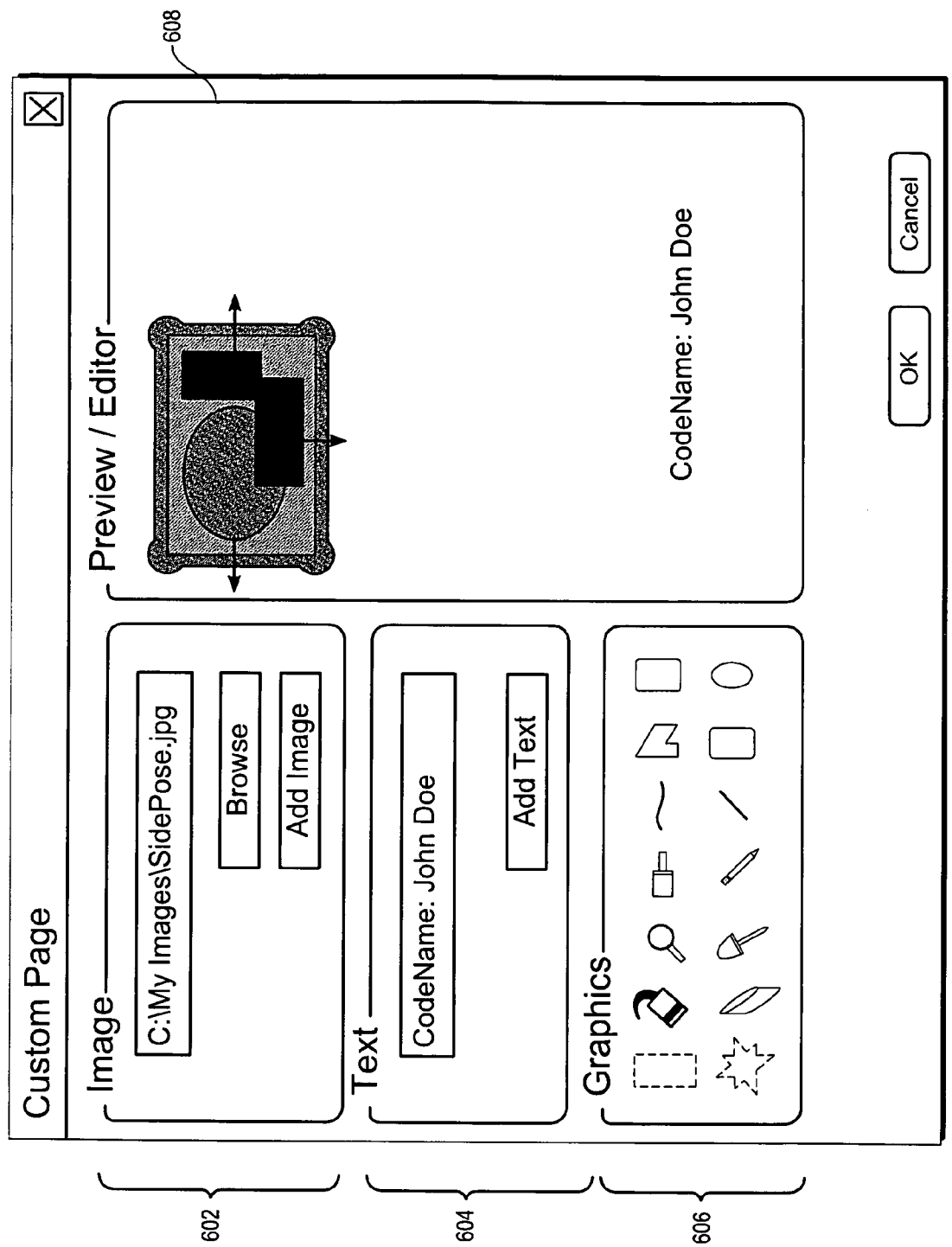
FIG. 6 is a block diagram that depicts an example "Custom Page" dialog box, according to an embodiment of the invention.

FIG. 6 is a block diagram that depicts an example "Custom Page" dialog box, according to an embodiment of the invention. Using the "Custom Page" dialog box, a user can specify how a corresponding "additional" page (e.g., a header, separator, or footer page) should look when it is printed. Thus, the user is not constrained, content-wise, by the printing device or operating system.

In one embodiment of the invention, the "Custom Page" dialog box includes image specifying controls 602, text specifying controls 604, graphic manipulation controls 606, and a preview/editor display 608. Generally, a user can use controls 602-606 to modify the content shown in preview/editor display 608. Generally, preview/editor display 608 shows an approximation of how the "additional" page will look when printed. In one embodiment of the invention, a user can drag, drop, and click items shown in display 608 to change the items (e.g., images and text) shown therein, and/or to move those items around.

In one embodiment of the invention, image specifying controls 602 comprise a text box in which a user can type a pathname for an image file (e.g., a JPEG, GIF, or bitmap-formatted image). When the user activates an "Add Image" button control, code in printer driver 206 causes the image represented by the file specified within the text box to be inserted into display 608. Once inserted, a user can drag the image to a desired location within display 608. By repeating these actions, a user can inserts as many images as he wants into display 608. Additionally, in one embodiment of the invention, image specifying controls 602 comprise a "browse" button control that, when activated, causes a file system-navigating interface to be displayed. Such file system-navigating interfaces are well known. Using the file system-navigating interface, a user can specify an image-representing file within the text box without actually typing the pathname for that file.

In one embodiment of the invention, text specifying controls 602 comprise a text box in which a user can type text. When the user activates an "Add Text" button control, code in printer driver 206 causes the text specified within the text box to be inserted into display 608. Once inserted, a user can drag the text to a desired location within display 608. By repeating these actions, a user can inserts as much text as he wants into display 608.

In one embodiment of the invention, graphic manipulation controls 606 comprise multiple graphical editing and viewing controls such as the kind that are commonly included in image-editing applications (e.g., "Microsoft Paint"). For example, the controls may include controls for selecting a portion of display 608, cutting the selected portion, pasting a previously selected portion, filling a specified region of display 608 with a specified color, drawing a line, drawing a shape, drawing a curve, selecting a color at a specified point in display 608, magnifying a portion of display 608, and/or erasing a portion of display 608. The functionality of these controls is, in one embodiment of the invention, similar to the functionality of similar controls of the kind that are commonly included in image-editing applications.

In one embodiment of the invention, once the user has specified the content of the "additional" page, the user can cause the content, as shown in display 608, to be persistently stored on computer-readable persistent storage media (e.g., a hard drive) by activating an "OK" button in the "Custom Page" dialog box. As is discussed above, different content data may be stored for different types of "additional" pages. Thus, one set of content data may be stored for a header page, one set of content data may be stored for a separator page, and one set of content data may be stored for a footer page. When such a page is to be printed, the content data stored for that page is used to generate the print data for that page.

Figure 7:
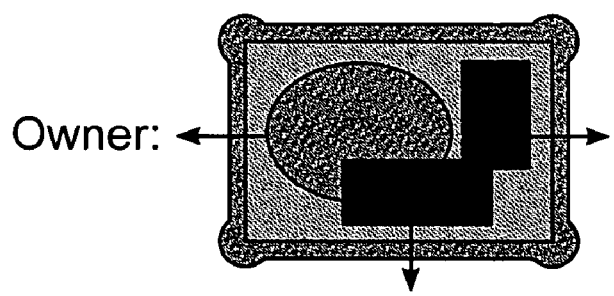
FIG. 7 is a block diagram that depicts an example user-customized header page, according to an embodiment of the invention.

FIG. 7 is a block diagram that depicts an example user-customized header page, according to an embodiment of the invention. The header page comprises an image and text that a user previously specified via the dialog boxes and user interfaces discussed above. In this particular example, the page indicates a number of pages in an electronic document, an office identifier, and a telephone number, among other information.

Implementation Mechanisms

Figure 8:
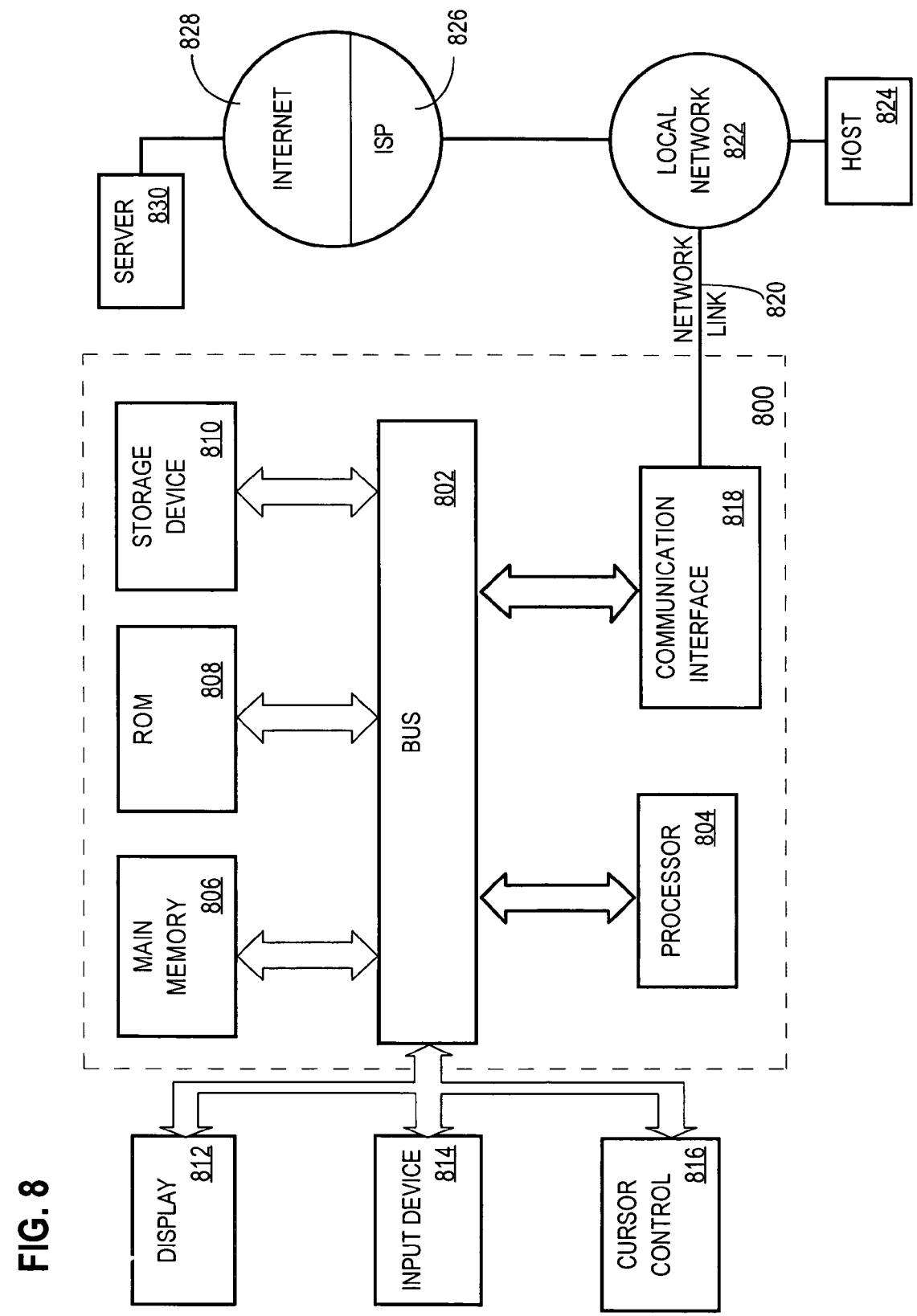
FIG. 8 is a block diagram that depicts a printing device upon which an embodiment of the invention may be implemented.

FIG. 8 is a block diagram that depicts a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), for displaying information to a user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 in a wireless communications architecture. According to one embodiment of the invention, wireless communications are provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a LAN card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the Internet 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for configuring a monitoring system to monitor selected network elements as described herein. Processor 804 may execute the received code as it is received and/or stored in storage device 810 or other non-volatile storage for later execution. In this manner, computer system 800 may obtain application code in the form of a carrier wave.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for processing print data, the method comprising:
   in response to a user's activation of a print mechanism of an application program, a printer driver displaying a first dialog box that comprises a first control;
   in response to a user's activation of the first control, the printer driver displaying a second dialog box that comprises (a) a second control for a header page, (b) a third control for a separator page, and (c) a fourth control for a footer page;
   in response to a user's activation of a particular control of the second control, the third control, and the fourth control, the printer driver displaying a third dialog box that comprises controls through which a user can insert images and text into a page specification for a page that corresponds to the particular control;
   the printer driver storing the page specification on a persistent storage medium;
   the printer driver generating modified print data by modifying original print data generated by an application program to include additional print data that represents the page specification; and
   the printer driver sending the modified print data to a printing device.

2. A computer-implemented method for processing print data, the method comprising:
   displaying a user interface that comprises one or more user interface elements through which a user can specify content that is to appear on one or more additional pages to be printed with an electronic document;
   receiving, through the user interface, user input that indicates a user-generated representation of the content that is to appear on the one or more additional pages;
   in response to receiving the user input through the user interface, a printer driver generating additional print data that reflects the user-generated representation of the content that is to appear on the one or more additional pages; and
   the printer driver generating modified print data based on original print data and the additional print data;
   wherein the original print data represents the electronic document;
   wherein the one or more additional pages include at least one of: (a) a header page that is to be printed before printing any page of the electronic document, (b) a footer page that is to be printed after printing every page of the electronic document, or (c) a separator page that is to be printed between printed pages of the electronic document; and
   wherein the modified print data includes the content that is to appear on the one or more additional pages.

3. The method of claim 2, wherein the one or more additional pages include the header page that is to be printed before printing any page of the electronic document.

4. The method of claim 2, wherein the one or more additional pages include the footer page that is to be printed after printing every page of the electronic document.

5. The method of claim 2, wherein the one or more additional pages include the separator page that is to be printed between printed pages of the electronic document.

6. The method of claim 2, wherein the program code for displaying the user interface is contained in the printer driver.

7. The method of claim 2, wherein the content comprises a user-specified image.

8. The method of claim 2, wherein the content comprises user-specified text.

9. A computer-implemented method for processing print data, the method comprising:
   displaying a user interface that comprises one or more user interface elements through which a user can specify content that is to appear on one or more additional pages to be printed with an electronic document;
   receiving, through the user interface, user input that indicates a user-generated representation of the content that is to appear on the one or more additional pages;
   in response to receiving the user input through the user interface, a printer driver generating additional print data that reflects the user-generated representation of the content that is to appear on the one or more additional pages; and
   the printer driver generating modified print data based on original print data and the additional print data;
   wherein the original print data represents the electronic document;
   wherein the modified print data includes the content that is to appear on the one or more additional pages;
   receiving, through the user interface, an indication of a user-specified frequency at which the one or more additional pages should be interspersed among pages of a printed copy of the electronic document;
   wherein the user-specified frequency indicates a number of pages; and
   wherein the modified print data causes a printing device to print an additional page between pages of the printed copy of the electronic document at the user-specified frequency.

10. A volatile or non-volatile computer-readable storage medium storing one or more sequences of instructions for customizing pages that a printer driver adds to a print job, wherein execution of the one or more sequences of instructions by one or more processors causes the one or more processors to perform the steps of:
    displaying a user interface that comprises one or more user interface elements through which a user can specify content that is to appear on one or more additional pages to be printed with an electronic document;
    receiving, through the user interface, user input that indicates a user-generated representation of the content that is to appear on the one or more additional pages;

in response to receiving the user input through the user interface, a printer driver generating additional print data that reflects the user-generated representation of the content that is to appear on the one or more additional pages; and the printer driver generating modified print data based on original print data and the additional print data;

wherein the original print data represents the electronic document;

wherein the one or more additional pages include at least one of: (a) a header page that is to be printed before printing any page of the electronic document, (b) a footer page that is to be printed after printing every page of the electronic document, or (c) a separator page that is to be printed between printed pages of the electronic document; and wherein the modified print data includes the content that is to appear on the one or more additional pages.

11. The computer-readable medium of claim 10, wherein the one or more additional pages include the header page that is to be printed before printing any page of the electronic document.

12. The computer-readable medium of claim 10, wherein the one or more additional pages include the footer page that is to be printed after printing every page of the electronic document.

13. The computer-readable medium of claim 10, wherein the one or more additional pages include the separator page that is to be printed between printed pages of the electronic document.

14. The computer-readable medium of claim 10, wherein the program code for displaying the user interface is contained in the printer driver.

15. The computer-readable medium of claim 10, wherein the content comprises a user-specified image.

16. The computer-readable medium of claim 10, wherein the content comprises user-specified text.

17. A volatile or non-volatile computer-readable storage medium storing one or more sequences of instructions for customizing pages that a printer driver adds to a print job, wherein execution of the one or more sequences of instructions by one or more processors causes the one or more processors to perform the steps of:

displaying a user interface that comprises one or more user interface elements through which a user can specify content that is to appear on one or more additional pages to be printed with an electronic document;

receiving, through the user interface, user input that indicates a user-generated representation of the content that is to appear on the one or more additional pages;

in response to receiving the user input through the user interface, a printer driver generating additional print data that reflects the user-generated representation of the content that is to appear on the one or more additional pages; and the printer driver generating modified print data based on original print data and the additional print data;

wherein the original print data represents the electronic document;

wherein the modified print data includes the content that is to appear on the one or more additional pages;

receiving, through the user interface, an indication of a user-specified frequency at which the one or more additional pages should be interspersed among pages of a printed copy of the electronic document;

wherein the user-specified frequency indicates a number of pages; and wherein the modified print data causes a printing device to print an additional page between pages of the printed copy of the electronic document at the user-specified frequency.

18. A volatile or non-volatile computer-readable storage medium storing one or more sequences of instructions for processing print data, wherein execution of the one or more sequences of instructions by one or more processors causes the one or more processors to perform the steps of:

in response to a user's activation of a print mechanism of an application program, a printer driver displaying a first dialog box that comprises a first control;

in response to a user's activation of the first control, the printer driver displaying a second dialog box that comprises (a) a second control for a header page, (b) a third control for a separator page, and (c) a fourth control for a footer page;

in response to a user's activation of a particular control of the second control, the third control, and the fourth control, the printer driver displaying a third dialog box that comprises controls through which a user can insert images and text into a page specification for a page that corresponds to the particular control;

the printer driver storing the page specification on a persistent storage medium;

the printer driver generating modified print data by modifying original print data generated by an application program to include additional print data that represents the page specification; and the printer driver sending the modified print data to a printing device.

* * * * *